US011537641B2

(12) United States Patent
Ware

(10) Patent No.: US 11,537,641 B2
(45) Date of Patent: Dec. 27, 2022

(54) IRRIGATION SUBSYSTEM AND METHOD FOR LOCATING A DECODER UNIT IN AN IRRIGATION SYSTEM

(71) Applicant: 2WIRE INNOVATIONS LTD., Aberdeen (GB)

(72) Inventor: John Antony Ware, Szentgyörgyvölgy (HU)

(*) Notice: Subject to any disclaimer, the term of this patent is extended or adjusted under 35 U.S.C. 154(b) by 17 days.

(21) Appl. No.: 17/427,214

(22) PCT Filed: Feb. 4, 2021

(86) PCT No.: PCT/HU2021/050008
§ 371 (c)(1),
(2) Date: Jul. 30, 2021

(87) PCT Pub. No.: WO2022/084705
PCT Pub. Date: Apr. 28, 2022

(65) Prior Publication Data
US 2022/0350823 A1 Nov. 3, 2022

(30) Foreign Application Priority Data
Oct. 19, 2020 (HU) .................... P2000345

(51) Int. Cl.
*B25J 9/16* (2006.01)
*G06F 16/29* (2019.01)
(Continued)

(52) U.S. Cl.
CPC .......... *G06F 16/29* (2019.01); *A01G 25/165* (2013.01); *H04W 12/06* (2013.01); *A01G 25/16* (2013.01); *G01S 19/13* (2013.01)

(58) Field of Classification Search
CPC . B25J 9/161; B25J 9/1697; B25J 9/163; B25J 9/1653; G05B 19/4099;
(Continued)

(56) References Cited

U.S. PATENT DOCUMENTS

| 7,359,769 B2 | 4/2008 | Bailey et al. |
| 7,930,069 B2 * | 4/2011 | Savelle, Jr ........... A01G 25/167 700/19 |

(Continued)

FOREIGN PATENT DOCUMENTS

WO 20190210212 A1 10/2019

OTHER PUBLICATIONS

Rajani et al., Design architecture of autonomous precision farming system, 2017, IEEE, p. 415-419 (Year: 2017).*
(Continued)

*Primary Examiner* — Mcdieunel Marc

(57) ABSTRACT

An irrigation subsystem for locating a decoder unit in an irrigation system includes an irrigation controller controlling a plurality of irrigation units installed around branches of one or more water pipes in a field. Each irrigation unit includes a decoder unit placed in a box partially sunk in a ground and a solenoid. The subsystem further includes a memory, a memory control controlling data loading and retrieval into the memory, and an NFC interface having an NFC plate arranged in the box ensuring communication and energy supply with a mobile phone of an installer or searcher when being positioned close to the NFC plate. The communication includes downloading location coordinates of the decoder unit into the memory. The irrigation controller includes a memory for storing location data obtained from the decoder units in the form of a location database.

10 Claims, 6 Drawing Sheets

(51) Int. Cl.
*A01G 25/16* (2006.01)
*H04W 12/06* (2021.01)
*G01S 19/13* (2010.01)

(58) Field of Classification Search
CPC .......... G05B 17/02; G05B 2219/49023; G05B 2219/36252; G05D 1/0221; G05D 1/0297; G05D 2201/0216; G02B 3/14; G02B 26/00; G06N 20/20; Y02P 80/40; Y02P 80/10; G06F 16/29; G01S 19/13; A01G 25/165; A01G 25/16; H04W 12/06
See application file for complete search history.

(56) References Cited

U.S. PATENT DOCUMENTS

| | | | | |
|---|---|---|---|---|
| 9,977,547 | B1* | 5/2018 | Sloo | G06K 19/08 |
| 10,617,072 | B2 | 4/2020 | Ware | |
| 2009/0099701 | A1 | 4/2009 | Li et al. | |
| 2011/0190947 | A1* | 8/2011 | Savelle, Jr | G05D 11/02 |
| | | | | 700/284 |
| 2017/0020087 | A1* | 1/2017 | Younis | A01G 25/16 |
| 2019/0102730 | A1* | 4/2019 | Giorgi | H04L 67/12 |
| 2020/0022322 | A1 | 1/2020 | Lafian | |
| 2020/0146229 | A1 | 5/2020 | Montgomery | |

OTHER PUBLICATIONS

Gutiérrez et al., Automated Irrigation System Using a Wireless Sensor Network and GPRS Module, 2013, IEEE, p. 166-176 (Year: 2013).*
Dubey et al., Wireless Sensor Network Based Remote Irrigation Control System and Automation Using DTMF Code, 2011, IEEE, p. 34-37pg. (Year: 2011).*
Yang et al., Automatic irrigation system based on wireless network, 2010, IEEE, p. 2120-2125 (Year: 2010).*
Kim et al., Remote Sensing and Control of an Irrigation System Using a Distributed Wireless Sensor Network, 2008, IEEE, p. 1379-1387 (Year: 2008).*
Malge et al., Novel, low cost remotely operated smart irrigation system, 2015, IEEE, pg. (Year: 2015).*
Ghosh et al., Smart irrigation: A smart drip irrigation system using cloud, android and data mining, 2016, IEEE, pg. (Year: 2016).*
PCT/HU2021/050008, dated Jul. 9, 2021, International Search Report and Written Opinion, 12 pages.

* cited by examiner

IRRIGATION SUBSYSTEM AND METHOD FOR LOCATING A DECODER UNIT IN AN IRRIGATION SYSTEM

CROSS-REFERENCE TO RELATED APPLICATIONS

The present application is a national stage entry of International Patent Application No. PCT/HU2021/050008, filed on Feb. 4, 2021, which claims priority to Hungarian Patent Application No. P2000345, filed on Oct. 19, 2020.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to an irrigation subsystem that facilitates finding of a decoder unit in the field in an irrigation system that comprises an irrigation controller controlling a plurality of irrigation units installed around branches of one or more water pipes in the field, wherein each irrigation unit comprises a decoder unit and a solenoid and a valve controlled by the solenoid to open or close water flow to sprinklers associated with the irrigation unit, and the decoder units are arranged in respective boxes buried in the ground so that at least the top of the boxes are on or above the ground surface and can be seen from a short distance, wherein a communication connection is provided between the decoder units and the irrigation controller.

The invention also relates to a method for locating a decoder unit in the field by using the irrigation subsystem.

Brief Description of the Related Art

Current irrigation systems use flow valves to control the supply of water to fluid emitters such as sprinklers. The irrigation systems used in agriculture, landscaping and golf courses typically comprise a large network of sprinklers and require accurate control of the actuation of individual flow valves.

The control of irrigation valves is often done by a central controller selectively activating wires associated with the specific irrigation valve. The actuation signal is sent through a plurality of buried wires, one wire dedicated to each irrigation valve and a common wire.

An alternative control system uses a plurality of electronically numbered irrigation decoders connected to a common two conductor electrical cable from a controller or alternatively a radio signal. The controller, through the decoder interface, sends a modulated digital data message commanding a particular decoder to actuate its associated irrigation valve. Those decoders whose pre-numbered addresses correspond with the number in the control message will act on it. The other decoders in the system will ignore the message. Current irrigation valves use a solenoid within the irrigation valve to control the opening and closing of the valve. The decoder is connected to the solenoid.

After installation, the system is handed over to the client and their maintenance staff. The decoders are usually below ground in boxes with a lid and are necessarily scattered around the site. Whilst the locations of all these boxes are first learned, over time, staff change, the installation is modified according to new needs and any prepared plans may be lost. It thus becomes increasingly difficult to locate the geographical position of a decoder or valve that the controller notes as faulty.

As example of such know irrigation systems U.S. Pat. No. 7,359,769 B2 can be mentioned, and the design of a valve control unit is shown in U.S. Pat. No. 10,617,072 B2.

SUMMARY OF THE INVENTION

The task of the present invention is to provide a unit location subsystem in such a conventional irrigation system that enables easy location of an particular irrigation unit even long after the installation of the system.

The invention also relates to a method for locating any required irrigation unit.

A further objective is to store additional information in the form of notes that might be important for the maintenance staff when a particular irrigation unit is visited.

These tasks have been solved by providing an irrigation subsystem for locating a decoder unit in an irrigation system that comprises an irrigation controller controlling a plurality of irrigation units installed around branches of one or more water pipes in the field, wherein each irrigation unit comprises a decoder unit and a solenoid and a valve controlled by the solenoid to open or close water flow to sprinklers associated with the irrigation unit, and the decoder units are arranged in respective boxes buried in the ground so that at least the lid of the boxes are on or above the ground surface and can be seen from a short distance, wherein a communication connection is provided between the decoder units and the said irrigation controller, wherein the subsystem comprises a memory, a memory control controlling data loading and retrieval into the memory, an NFC interface having an NFC plate arranged in the box ensuring communication and energy supply with a mobile phone of an installer or searcher when being positioned close to the NFC plate, the communication including downloading the location coordinates of the decoder unit into the memory, the memory is connected with the decoder unit to provide communication with the irrigation controller upon request from the irrigation controller, wherein the irrigation controller comprises a memory for storing location data obtained from the decoder units in the form of a location database.

In a preferred embodiment the communication between the mobile phone with the installer or searcher includes downloading and storing notes in addition to the location data, and the location database in the irrigation controller includes the notes as associated with the corresponding location data.

For increasing security the memory control is programmed so that prior to allowing any communication with the mobile phone checks authenticity of the installer and/or searcher.

According to the invention a method has also been provided for the storage and retrieval of location data of respective irrigation units in an irrigation system using the previously defined subsystem that comprises the steps of:

during installation
(i) downloading the location data of said unit into the memory of the unit by a mobile phone equipped with a GPS receiver and brought close to the NFC plate,
(ii) downloading the location data of the unit into the memory in the irrigation controller, and
(iii) compiling and storing a location database in the memory of the irrigation controller following the location information have been collected from all units, during searching a particular one of said units
(iv) downloading the location data of the searched unit into the mobile phone of a searcher, and
(v) using a GPS searching program in the mobile phone to guide the searcher to the selected one of the units.

In a preferred embodiment step (ii) is carried out by storing the location data in the mobile phone and downloading these data by connecting the mobile phone with the irrigation controller.

In an alternative embodiment step (ii) is carried out by storing the location data upon sending a request message to the respective decoder units from the irrigation controller to deliver the stored location data.

Here is it preferred if the request for sending the location data is repeated in long intervals for updating the location database.

In a further preferred step the downloading of the location data is associated together with notes characteristic to the particular unit and storing and handling the notes together with the location data in the location database.

It is also preferred if at the units the authenticity of the mobile phone is checked before allowing the communication.

BRIEF DESCRIPTION OF THE SEVERAL VIEWS OF THE DRAWINGS

The invention will now be described in connection with preferable embodiments thereof in which reference will be made to the accompanying drawings. In the drawing.

DETAILED DESCRIPTION OF THE INVENTION

Figure 1:
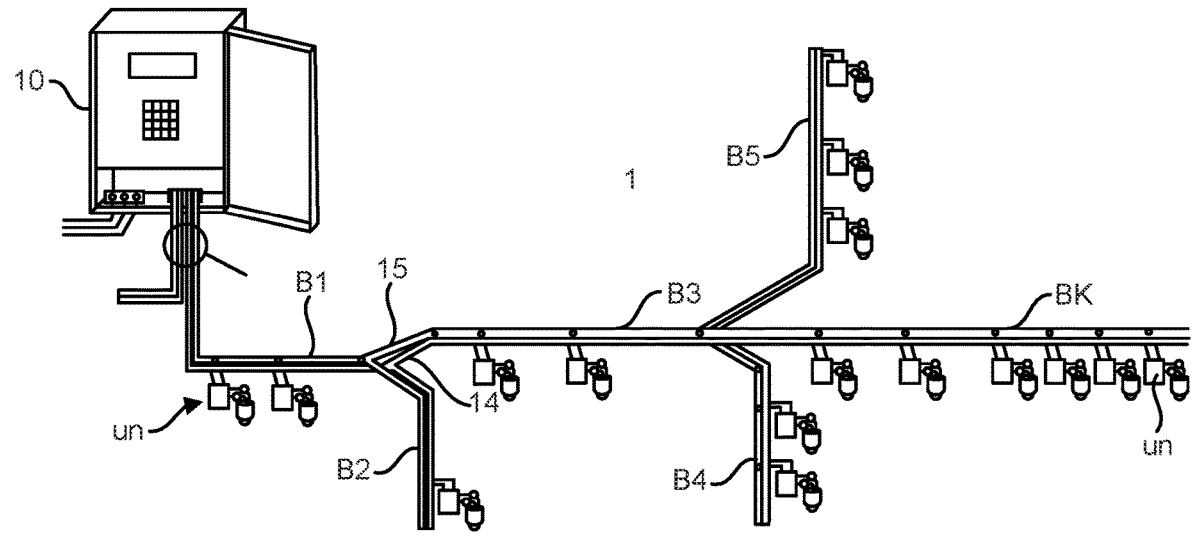
FIG. 1 shows the general layout of a known irrigations system with a central irrigation controller in which the invention can be used.
Figure 2:
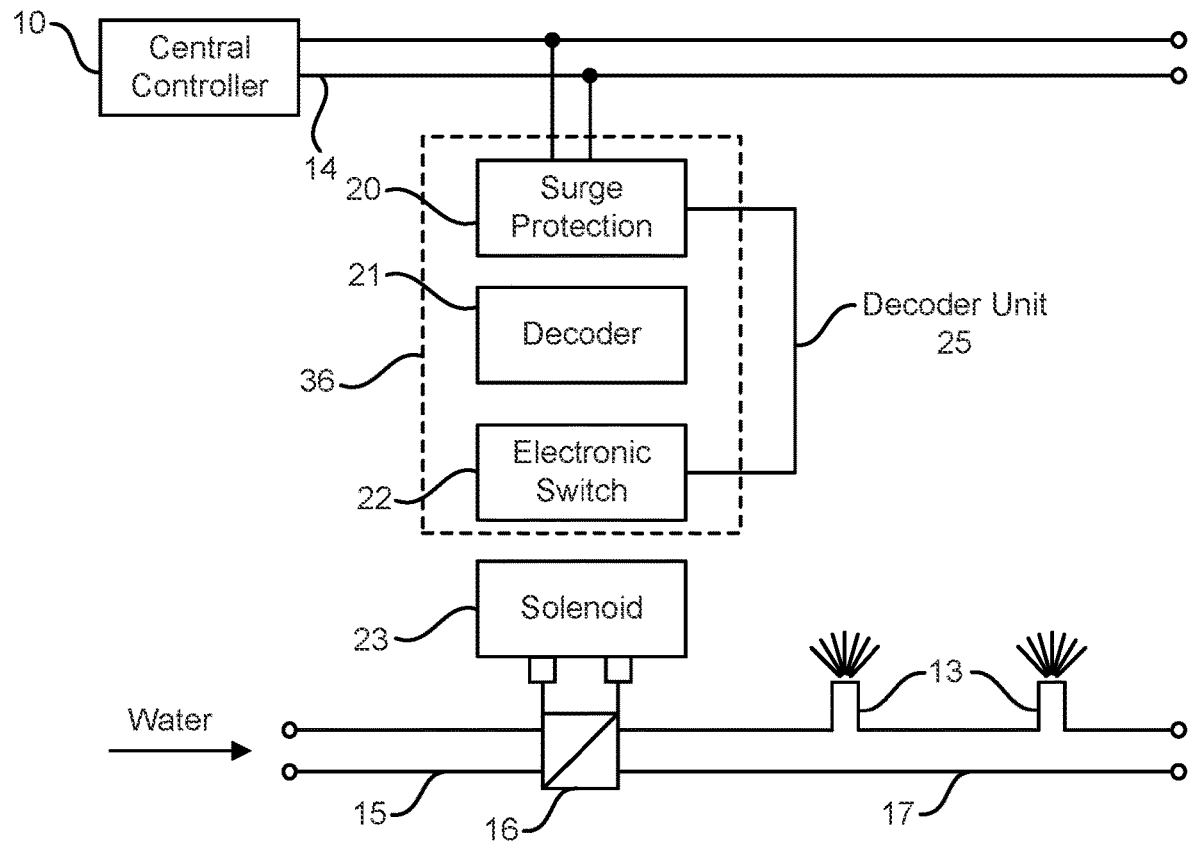
FIG. 2 shows the schematic block diagram of an irrigation station of the system shown in FIG. 1.

Reference is made to FIG. 1 which is the schematic layout of a prior art irrigation system 1 controlled by a central irrigation controller 10. The system 1 shown can be complemented by the blocks required for practicing the present invention. The system 1 is adapted to irrigate a large area in the field away from the irrigation controller 10, and can have several branches B1, B2, . . . Bk along which respective groups of units U1 . . . Un are deployed, in which n>k. Each unit Ui comprises functional elements shown separately in FIG. 2 which has a decoder unit 25 as main part and at least one sprinkler 13. A plurality of the sprinklers 13 (which is the most typical case) are arranged in each unit, and the required water supply of the sprinklers 13 is provided through water pipe 15 through a controlled valve 16 operated by a solenoid 23 and controlled by the decoder unit 25 (FIG. 2).

A communication channel is provided between the respective units Ui and the irrigation controller 10. While the communication can be provided through wireless channels, the use of cabled connection is the most widely applied way of communication, in which wires 14 supplying electric power to the units are also utilized by superimposed pulse modulation as means of communication.

In the system 1 the irrigation controller 10 can set each unit into operation or terminate operation by sending a coded message including the individual addresses of the selected unit, and decoder 21 in the unit recognizes its address and carries out the command that uses its address, i.e. opens or closes the associated valve 16, whereby the sprinklers 13 in the unit start or stop irrigation. Naturally, the start and stop times are determined in groups, therefore the irrigation controller 10 mostly addresses all decoders in a target group and starts and stops irrigation simultaneously in the whole group.

As mentioned earlier, FIG. 2 shows the block diagram of a unit, and this also belongs to the prior art. A surge protection circuit 20 is connected between the wires 14 and the input of the decoder 21 to prevent the circuitry against unwanted electrical shocks. The decoder 21 after identifying and decoding a message sent to it operates an electronic switch 22 (or relay) to supply power to the solenoid 23, and when energized the solenoid 23 allows the flow of water through the valve 16. Following the opening of the switch 22 the solenoid 23 returns to its base state and the flow path of water will be closed. The decoder unit 25 and the associated solenoid 23 are generally included in a box 36 illustrated by dash line in FIG. 2 indicating the parts arranged in the box 36.

Figure 3:
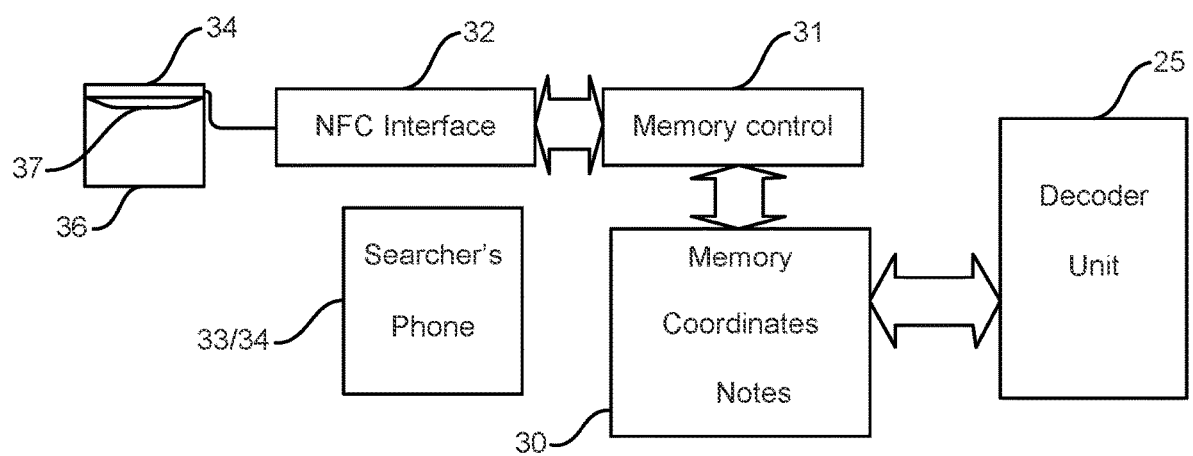
FIG. 3 shows the blocks by which the decoder of FIG. 2 should be complemented in a preferred embodiment of the present invention.
Figure 4:
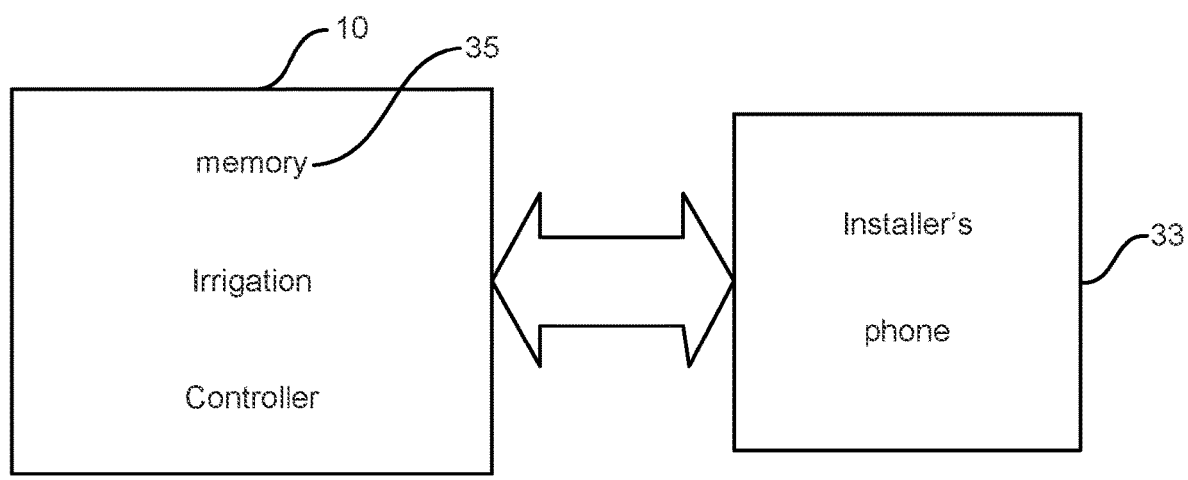
FIG. 4 is a sketch how the irrigation memory should be implemented and used during installation.

A preferred embodiment of the present invention is used in the known system 1 shown in FIGS. 1 and 2. For such use both the central controller 10 and all decoder units 25 should be modified, more particularly complemented with the following functional blocks as shown in FIGS. 3 and 4.

Assuming that the system 1 has just been installed on the field and the decoder units 25 are placed in their respective boxes 36 sunk in the ground so that only their top lids are on or slightly above the ground level. The box 36 can be noticed only from a small distance. The decoder unit 25 comprises now further functional blocks as illustrated in FIG. 3. The decoder 21 in the decoder unit 25 comprises certain intelligence and a processor that can be used and programmed to tasks exceeding the simple task of recognizing the received coded message. A programmable memory 30 is connected to the decoder unit 25 which is also connected to a memory control 31. An NFC interface 32 with an NFC plate or sheet 37 is placed in the box 36 in which the decoder unit 25 is arranged. NFC is the widely used abbreviation of Near Field Communications, and its essence lies in that when an active device, like a mobile phone 33 is brought to the vicinity of the NFC plate 37 by means of electromagnetic coupling the NFC interface 32 receives sufficient energy to set the electronic units in the box 36 into operation and a data exchange will be possible between the phone 33 and the NFC interface 32. Otherwise the NFC interface 32 is a passive element that has no power consumption.

In the exemplary situation a person belonging to the installation staff (let us call him: installer) has the task of visiting all the installed units U1 Un, especially to find their respective boxes 36 and to enter information into the memory 30 for long term storage. The mobile phone 33 (or any other similar device, like a laptop or tablet) has a built in GPS receiver and the momentary GPS coordinates or location data can be obtained from the mobile phone 33. To this end the installer must download an appropriate application program before he carries out his task, and this program may include an authorization code. The application program allows the installer to use the actual GPS location data and also to write a message in the form of a note (which can be plain or coded text).

When the installer visits a particular decoder unit 25, he opens the lid of the box 36 and places his phone 33 close to the NFC plate 37 and uses his application program to energize the blocks built in the decoder unit 25. If the protocol used includes authorization, the memory control 31 will request the transmission of an authorization code and if this is provided, the authorization is checked and a "start dialogue" or similar message is sent to the phone 33.

In the next step the momentary location data (i.e. the actual GPS coordinates of the decoder unit 25) will be sent from the mobile phone 33 and will be stored into the memory 30. The successful storage is reported and the application program is ready to enter a note in the memory 30 for long term storage. The note can be any useful information, e.g. the number and type of the associated sprinklers, the date of the last maintenance or any other message which might be helpful concerning the safe operation of the particular unit. As an extreme example, if there is any special object in the nearby terrain, one might store its description so that this could facilitate finding the decoder unit 25 easier.

Figure 5:
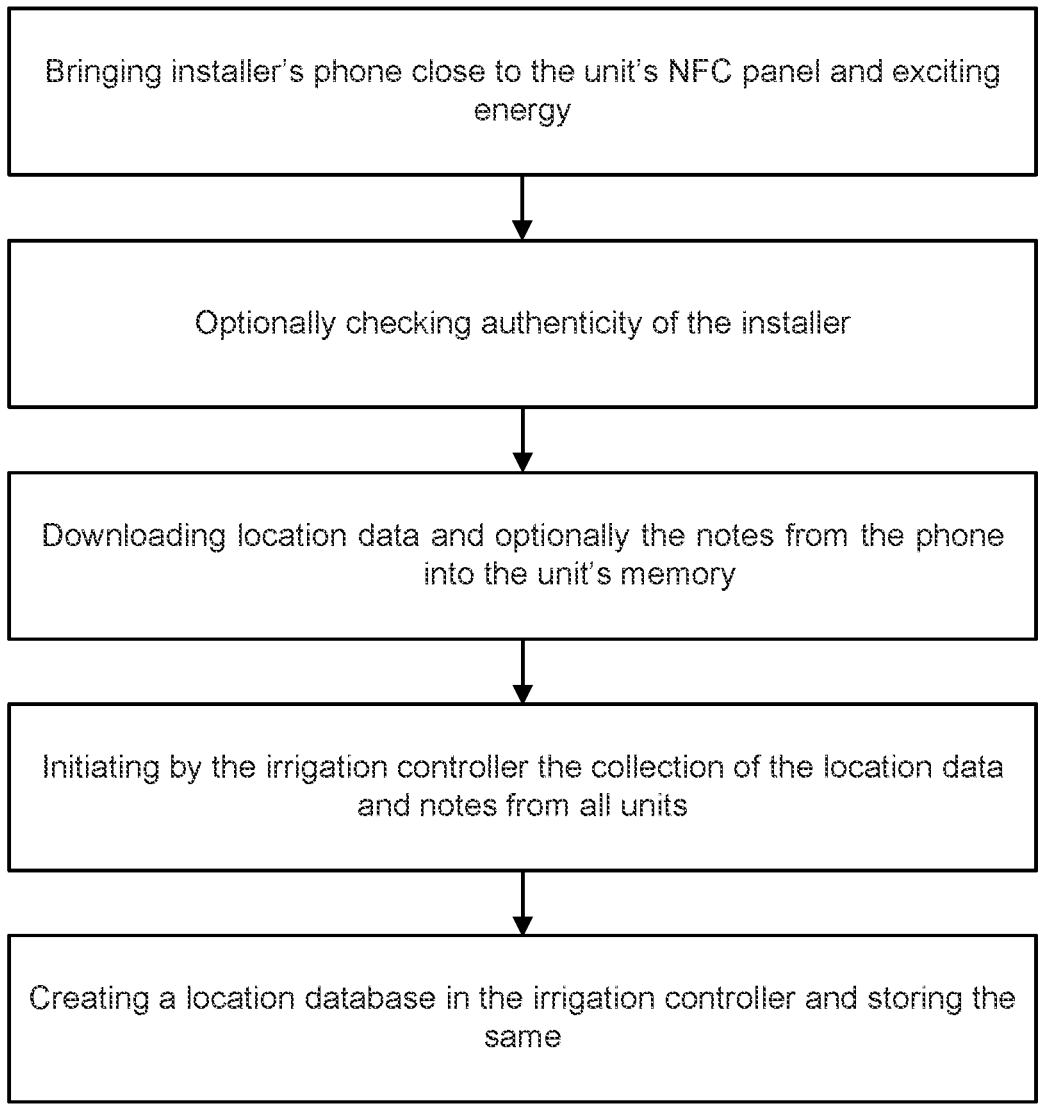
FIG. 5 is a flow chart illustrating the steps of entering location data.

In case the installer has finished visiting all units or only the recently installed ones, he returns to the irrigation controller 10 and connects his phone 33 (either through bluetooth or through wifi or with a cable) with the irrigation controller 10 which comprises now a memory 35 assigned to this task (see FIG. 4), and downloads all the collected location information and associated notes organized by the number or code of the concerned units. By this act the memory 35 will store a location database for the system 1. The described steps of making the location database are shown in the flowchart of FIG. 5. A further possibility lies in that in intermittent periods the irrigation controller 10 sends respective messages to all concerned units to request sending the stored location data. This requires the use of a special code different from the ones setting the unit to allow or terminate water flow. There are several ways of creating communication superimposed on wires therefore the details of this will not be described. By such actions the intermittent refreshment of the location database can be carried out.

Figure 6:
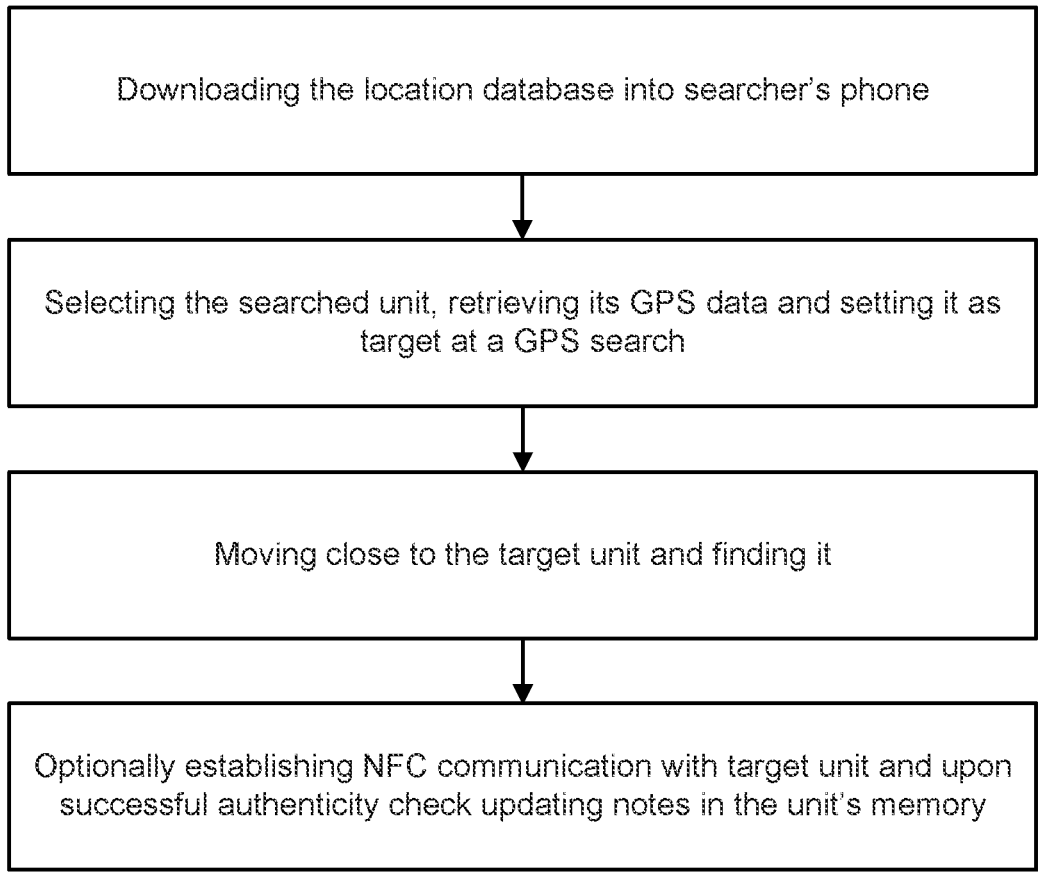
FIG. 6 is a similar flow chart illustrating the steps of finding a particular decoder and optionally modifying the notes stored therein.

During operation of the system 1 several events may happen, including the need for replacement of nozzles in certain sprinklers, replacement of the sprinklers and/or certain ones of the units, malfunction of certain units, need for partial re-arrangement, etc. After a time following the installation the system 1 can be taken over by a new staff or entity, and the need of visiting one or more particular units will be required. To find any searched unit easily, the steps shown in the flowchart of FIG. 6 will be carried out. First the authorized person called now 'searcher' has also a mobile phone 34 also equipped with the specific application program and GPS route searching facility will first download the location database from the memory 35 of the irrigation controller 10 on site or through an intranet or the internet (if this is allowed to be used by the competent staff).

The searcher has to first inquire about the location of a selected particular unit Bi. After he has downloaded the location database, he then enters the code or name of the searched unit and the database will retrieve the location data of the unit. By entering these GPS location data as search information or target into his GPS route searching program he will be lead to the target in a conventional way. In case there is a route leading close to the target, he will be directed to the route. Otherwise, if there are no built routes, the searcher will have to use an electronic map in which lanes or other non-conventional routes are indicated. Such maps are available for those who like outdoor sports and excursions, and the GPS system (when equipped with such a map) will give the directions to the target. Nowadays the accuracy of GPS-based search is so high that the target can be found with an error of at most 2-5 meters. Professional GPS receivers have even higher accuracy which can locate a target with an error of less than 1 meter. When the searcher arrives to the target he will notice the top of the box 36 of the searched unit. By this the main task has been completed.

If the searcher has authorization, he can build an NFC connection with the NFC interface 32 as described earlier, and he can download an updated notice, e.g. enter the current date as a recent maintenance date.

In case his task is to relocate the unit with its sprinklers, he can enter the new location data of the concerned unit and this will be downloaded in the location database when the irrigation controller 10 collects new location data.

It is worth mentioning that the possibility of reading and collecting notes from the geographically scattered units provides a great assistance in maintaining the system 1 in good and functional state.

While the present invention has been described in connection with a preferred embodiment, it can be appreciated that terms like mobile phone are equivalent with a laptop or tablet or any smart device equipped with the required application program. Also, the NFC connection is the most convenient as it does not require electrical energy in the decoder unit 25 for the communication, the essence of the invention will not change in case of bluetooth or other wireless communication is used, or even a wired communication can be used if the mobile phone 33 or 34 is connected by a wire and appropriate connector to the top of the box 36. The invention cannot be limited to the literal meaning of the used terms but these alternative possibilities are also included.

The invention claimed is:

1. An irrigation subsystem arranged in a box (36) of an irrigation unit of an irrigation system (1) to locate a corresponding decoder unit (25), the irrigation subsystem comprising:
    a memory (30),
    a memory control (31) controlling data loading and retrieval into the memory (30), and
    an NFC interface (32) having an NFC plate (37) arranged inside the box (36) ensuring energy supply and communication with a mobile phone (33, 34) of an installer or searcher when being positioned close to the NFC plate (37), said communication including downloading location coordinates of the corresponding decoder unit (25) into the memory (30), wherein a communication connection is provided between the corresponding decoder unit (25) and an irrigation controller (10) of the irrigation system (1), and wherein the irrigation controller (10) comprises a memory (35) for storing location data obtained from the corresponding decoder unit (25) of the irrigation unit in the form of a location database.

2. The irrigation subsystem of claim 1, wherein the memory (30) is connected with the corresponding decoder unit (25) to provide a communication with the irrigation controller (10) upon request from the irrigation controller.

3. The irrigation subsystem of claim 1, wherein said communication between the mobile phone (33, 34) with the installer or searcher includes downloading and storing notes in addition to said location data, and said location database in said irrigation controller (10) includes said notes as associated with the location data.

4. The irrigation subsystem of claim 1, wherein said memory control (31) is programmed so that, prior to allowing any communication with the mobile phone (33, 34), the memory control checks an authenticity of the installer or searcher.

5. A method for storing and retrieving location data of one or more irrigation units (U1 . . . Un) in an irrigation system, comprising:

during installation, for each said one or more irrigation units,
(i) downloading location data of an irrigation unit into a memory (30) of the irrigation unit by a mobile phone (33) equipped with a GPS receiver and brought close to a NFC plate (37) stored within a box (36) of the irrigation unit,
(ii) downloading the location data of the irrigation unit into a memory (35) of an irrigation controller (10), and
(iii) compiling and storing a location database in the memory (35) of the irrigation controller (10) following collection of the location information from each said one or more irrigation units; and during searching for a particular irrigation unit of the one or more irrigation units,
(iv) downloading the location data of the particular irrigation unit into the mobile phone (34) of a searcher, and
(v) using a GPS searching program in said mobile phone (34) to guide the searcher to the particular irrigation unit.

6. The method of claim 5, wherein step (ii) is carried out by storing the location data in the mobile phone (33) and downloading the location data by connecting the mobile phone (33) with the irrigation controller (10).

7. The method of claim 5, wherein step (ii) is carried out by storing the location data upon sending a request message to a respective decoder unit (25) from the irrigation controller (10) to deliver the location data.

8. The method of claim 7, wherein the request message for sending the location data is repeated in long intervals for updating the location database.

9. The method of claim 5, further comprising associating said downloading of the location data together with a notes characteristic to the particular irrigation unit, and storing and handling the notes characteristic together with the location data in the location database.

10. The method of claim 5, wherein each said one or more irrigation units check an authenticity of the mobile phone (33, 34) before allowing the downloading of the location data.

* * * * *